W. A. TURBAYNE.
STOP CHARGE ELECTRIC REGULATOR.
APPLICATION FILED AUG. 15, 1911. RENEWED APR. 29, 1919.
1,324,573. Patented Dec. 9, 1919.
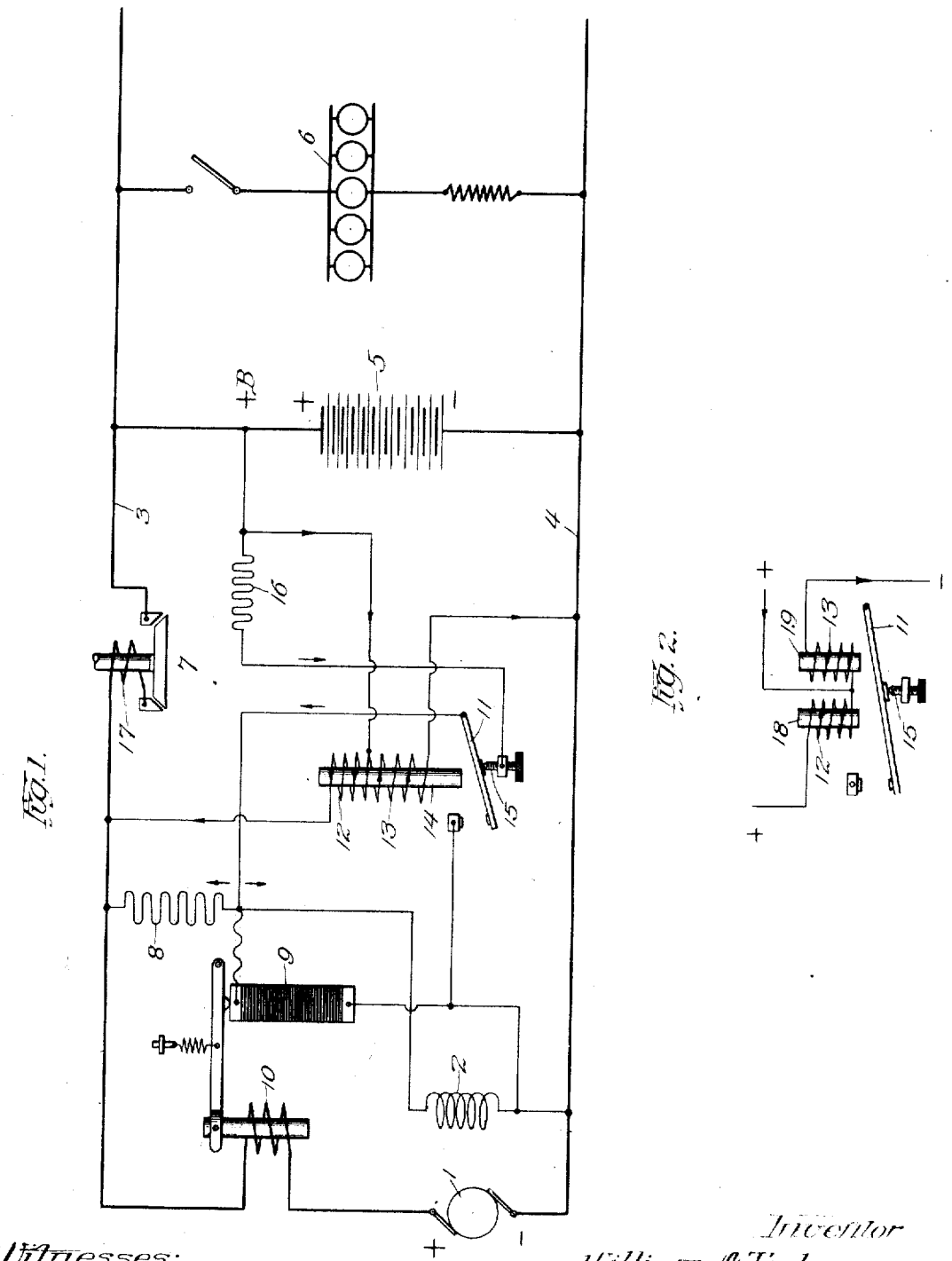

UNITED STATES PATENT OFFICE.

WILLIAM A. TURBAYNE, OF BUFFALO, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

STOP-CHARGE ELECTRIC REGULATOR.

1,324,573.   Specification of Letters Patent.   Patented Dec. 9, 1919.

Application filed August 15, 1911, Serial No. 644,235. Renewed April 29, 1919. Serial No. 293,497.

*To all whom it may concern:*

Be it known that I, WILLIAM A. TURBAYNE, a citizen of the United States, residing at Buffalo, in the county of Erie and State of New York, have invented new and useful Improvements in Stop-Charge Electric Regulators, of which the following is a full, clear, concise, and exact description, reference being had to the accompanying drawing, forming a part of this specification.

My invention relates to electric regulators and to systems of electrical distribution employing such regulators.

One of the objects of my invention is to provide means for decreasing the generator current output upon the attainment of certain predetermined voltage conditions in the circuit with which said generator is connected. Another object is to provide means for preventing the overcharging of the storage battery forming a part of said system. A further object is to provide a regulator, including a stop charge relay device, adapted to respond only upon the attainment of a certain counter-electro-motive force of the battery. A still further object is to provide means for insuring a rapid building up of the generator unaffected by the regulator.

The invention may be embodied in various forms, and may be applied in various ways. For the purpose of illustrating the main features of the invention, I have illustrated a car-lighting system including as a part thereof one form of regulator. It is apparent that the invention may be embodied in other forms, however.

In the car-lighting system illustrated, the current is furnished by a shunt wound generator to an external circuit across which a storage battery and lamps are connected in parallel branches. The generator is regulated for a substantially constant current output, subject to certain modifications. The generator regulation is accomplished, in general, by connecting a variable resistance around the generator shunt field, and by so regulating the variable resistance, in response to variations in the generator current output, as to divert more or less current from the generator shunt field, thereby tending to restore normal conditions. When the storage battery which is being charged by said generator approaches a fully charged condition, a voltage responsive coil connected across the battery terminals responds, and closes a second shunt circuit, of low resistance, around the generator field winding, thereby weakening said field decidedly and reducing the generator current output, and hence reducing the battery charging current, thereby preventing overcharging of the battery.

In the accompanying drawings I have illustrated diagrammatically the system and devices referred to.

Figure 1 is a diagram of the car-lighting system as a whole.

Fig. 2 is a diagram of a modified form of the stop charge relay device.

Referring to Fig. 1. An axle driven generator is provided, comprising the armature 1 and shunt field winding 2. The generator supplies the external circuit 3, 4, across which the storage battery 5 and lamps 6 are connected, in parallel branches. The automatic switch 7 is adapted to close the external circuit from the generator to the storage battery and lamps when the voltage of the generator is equal to or slightly in excess of the battery voltage. The maximum current-carrying capacity of the generator field circuit is limited by a fixed resistance 8 connected in series with the field winding 2. The energization of the generator shunt field is varied by diverting current by means of a variable resistance 9 connected in a shunt circuit around said field winding. The variable resistance 9 may assume various forms, and it is illustrated as a variable pressure rheostat of well known characteristics. Said variable resistance is controlled by the series controlling winding 10 connected in the external circuit of the generator and responsive to variations in the generator current output. Upon any tendency of the generator current output to increase above a predetermined value, the energization of the controlling winding 10 increases somewhat, thereby decreasing the variable resistance 9 and diverting current from the field winding 2, whereupon the energization of said field winding is reduced, tending to restore normal conditions. When the generator current output tends to drop below the desired normal value, the reverse operation takes place. The mechanical connections between the controlling winding 10 and the variable resistance 9 are such that when the generator is at rest, said resistance is normally a maximum, whereby current diverted from the field winding of the generator is a minimum, so that the generator may build up its field strength rapidly when the armature begins to rotate.

In order to prevent overcharging of the battery, it is desirable to reduce the generator current output when the counter-electro-motive force of the battery reaches a predetermined value. To accomplish this result, I provide a shunt circuit of low resistance around the generator field winding 2. This shunt circuit may be closed by a pivoted contact member 11 which, together with the voltage responsive windings 12 and 13, constitutes a stop charge relay device. It will be apparent that when said shunt circuit is closed by the stop charge relay device, the generator field winding 2 will be substantially short-circuited, thereby at once reducing the generator current output, and hence the battery charging current. A resistance of definite value is preferably inserted in this shunt circuit if desired, so that the generator field will not be completely short-circuited, if it is desired to develop a slight E. M. F. at the generator terminals.

The relay coils 12 and 13 constitute in effect a single electromagnetic winding, being wound in the same direction and joined as shown, at a point representing the middle point of the winding as a whole. One terminal of the electromagnetic winding as a whole is connected to the main circuit between the generator and the automatic switch and hence is connected to the positive generator terminal. The other terminal is connected to the negative generator terminal, which is also common to the battery. In other words, this winding is connected across the external circuit and tends to respond to the voltage of the system. The middle point of this winding, however, which middle point is common to both coils 12 and 13, is connected to the positive battery terminal, so that when the generator is at rest, as in the diagram, and the automatic switch open, current will flow from the battery through the two coils 12 and 13 in opposite directions, so that no magnetic flux will exist in the common core 14 of said coils to cause an attraction of the armature relay 11. This insures that the stop charge relay will open whenever the generator voltage is sufficiently reduced to cause the automatic switch to open. The generator is thereby enabled to build up rapidly whenever the train starts, as the field is practically free from the influence of the regulator and may attain maximum excitation at relatively low speeds. This armature relay normally rests against the adjustable contact 15, and thereby closes a local circuit around the battery through the generator shunt field 2, the excitation resistance 16 being inserted to prevent waste of battery current. This local excitation circuit insures that the generator will always excite its field in the proper direction when the armature begins to rotate, and it also aids the generator in building up its field strength rapidly.

When the armature 1 begins to rotate, the generator voltage builds up rapidly, the automatic switch 7 closing when the generator voltage is equal to or slightly in excess of the battery voltage, due to the increased energization of a lifting coil (not shown). As the generator voltage builds up, the E. M. F. effective across the coil 12 will at any time be the difference between the battery voltage and the generator voltage, so that this effective voltage will diminish as the generator builds up. When the automatic switch closes, this effective voltage is substantially zero. The closing of the automatic switch short-circuits the coil 12. The coil 13, however, is connected across the battery terminals, and responds to the C. E. M. F. of said battery. When said C. E. M. F. rises perceptibly, as occurs when the battery has attained a fully charged condition, the coil 13 attracts its armature 11, thereby short-circuiting the generator field 2, and, of course, short-circuiting the variable resistance 9. The generator current output is accordingly nearly eliminated, or, as previously stated, it may be reduced to any desired value by the insertion of a suitable resistance in the shunt circuit. The closing of the stop charge relay also opens the excitation circuit with the arrangement of contacts disclosed, although this is by no means essential.

The reduction in generator voltage due to the closing of the relay permits the battery to discharge through the automatic switch, thereby permitting the same to fall open. After said switch opens, battery current traverses the coils 12 and 13 in opposite directions, as previously described, and reestablishes the circuits shown in the diagram. While the automatic switch is open the battery carries the lamp load, and during this interval the train may come to a stop without affecting the lighting circuit. When the train again starts, the previous cycle of operation is repeated.

In Fig. 2, the stop charge device is illustrated as being provided with two coils 12 and 13, each wound on a separate core 18 and 19. The circuit connections are the same, however, and the general operation of the relay is the same as that previously described.

It will be seen that I do not desire to limit myself to the circuit connections shown and described, or to the details of the various regulating elements, as it is apparent that these embodiments were selected for the purpose of illustration only. I desire, therefore, to cover any suitable equivalent means for accomplishing the desired results and falling within the scope of the appended claims.

What I claim as new and desire to secure by Letters Patent is:—

1. Generator regulating means including in combination with the generator field winding, means including a variable resistance for diverting current from said field winding for regulating purposes, and a circuit in shunt to said resistance adapted under predetermined conditions to divert current from said resistance to decrease the energization of said field.

2. Means for regulating a generator including in combination with the field winding thereof, a variable resistance in shunt to said field winding, said resistance having an operating coil for varying the amount of current diverted from said field winding, and means operative under predetermined conditions to divert current from said resistance to further decrease the energization of said field.

3. A system of electrical regulation, comprising a generator having a field winding, a variable pressure rheostat connected in a shunt circuit around said winding, a controlling winding connected in the external circuit of the generator and responsive to variations in the generator current output, said controlling winding coöperating with said variable pressure rheostat to divert current from said field winding for the purpose of varying the energization thereof in accordance with variations in said generator current output, and a stop charge relay device adapted to close a shunt circuit around said variable pressure rheostat for the purpose of decreasing the generator current output upon the attainment of a predetermined voltage of the system.

4. A system of electrical regulation, comprising a generator having a field winding, an external circuit supplied thereby, a storage battery and translating devices connected across said external circuit in parallel branches, a series regulating winding connected in said external circuit to respond to variations in the generator current output, a variable resistance connected around said generator field winding and operated by said series regulating winding to divert current from said field for regulating purposes, and a stop charge relay device connected around the battery terminals, said relay device being adapted, upon sufficient increase in the counter-electro-motive force of said battery, to close a shunt circuit around said field winding, whereby said generator current output, and hence the battery charging current, is reduced.

5. A system of electrical regulation, comprising a generator having a shunt field winding, an external circuit supplied thereby, a storage battery and translating devices connected across said external circuit in parallel branches, a series regulating winding connected in said external circuit to respond to variations in the generator current output, a variable resistance connected around said generator shunt field winding and operated by said series regulating winding to divert current from said shunt field for regulating purposes, and a stop charge relay device connected around the battery terminals, said relay device being adapted, upon sufficient increase in the counter-electro-motive force of said battery, to close a shunt circuit around said shunt field winding, whereby said generator current output, and hence the battery charging current, is reduced, said stop charge relay comprising a pivoted contact arm which normally closes an excitation circuit around said battery in which said generator shunt field is included.

6. A system of electrical regulation, comprising a generator having a shunt field winding, an external circuit supplied thereby, a storage battery and translating devices connected across said external circuit in parallel branches, an automatic switch in the external circuit for connecting said generator with said storage battery under predetermined conditions, a series controlling winding in said external circuit, a variable resistance connected around said generator shunt field circuit for the purpose of diverting current therefrom, said variable resistance being controlled by said series controlling winding to regulate the generator current output, and a stop charge relay device for closing a circuit of low resistance around said shunt field winding for the purpose of decreasing the generator current output when said battery approaches a fully charged condition.

7. A system of electrical regulation, comprising a generator having a shunt field winding, an external circuit supplied thereby, a storage battery and translating devices connected across said external circuit in parallel branches, an automatic switch in the external circuit for connecting said generator with said storage battery under predetermined conditions, a series controlling winding in said external circuit, a variable resistance connected around said generator shunt field circuit for the purpose of diverting current therefrom, said variable resistance being controlled by said series controlling winding to regulate the generator current output, a stop charge relay device for closing a circuit of low resistance around said shunt field winding for the purpose of decreasing the generator current output when said battery approaches a fully charged condition, said relay device comprising two relay coils connected so as to form substantially a continuous electromagnetic winding, said electromagnetic winding being connected across said external circuit between said generator and said automatic switch, and a second connection from the point of connection between said two coils to a point between said automatic switch and said storage battery.

8. In a system of regulation wherein the energization of a generator shunt field winding is varied by shunting a variable amount of current around the same, in combination with the shunt field winding of said generator, a voltage responsive relay for closing a second shunt circuit around said field winding, and an auxiliary differential winding for insuring the opening of said relay under predetermined conditions.

9. A regulating system for a variable speed generator including a generator regulator, operating means therefor, means responsive to electrical conditions in the system for modifying the standard of operation of the regulator, and an automatic switch for connecting the generator to the system, said modifying means having means for rendering the same inoperative whenever the automatic switch is open.

10. Means for regulating a shunt wound generator including a variable pressure rheostat adapted to be connected in a shunt circuit around the shunt field winding of said generator, a series controlling winding therefor adapted to be connected in the external circuit of said generator, and a stop charge relay device adapted to be connected in another shunt circuit around said field winding, whereby said relay device may operate to divert current around said shunt field winding to decrease the generator current output under certain predetermined conditions.

11. Means for regulating a shunt wound generator including a variable pressure rheostat adapted to be connected in a shunt circuit around the shunt field winding of said generator, a series controlling winding therefor adapted to be connected in the external circuit of said generator, and a stop charge relay device adapted to be connected in another shunt circuit around said field winding, whereby said relay device may operate to divert current around said shunt field winding to decrease the generator current output under certain predetermined conditions, said relay device comprising two relay coils of equal effectiveness connected so as to form substantially a single electromagnetic winding, whereby when current is applied to said electromagnetic winding at the point of connection between said two coils, said coils are oppositely energized and the effectiveness of said electromagnetic winding is destroyed.

12. Means for regulating a shunt wound generator including a fixed resistance adapted to be connected in series with the shunt field winding of said generator, a variable pressure rheostat adapted to be connected around said shunt field winding and in series with said resistance, separable contacts connected in a shunt circuit around said variable pressure rheostat, and hence around said field winding, and a voltage responsive coil adapted to control said contacts to close said shunt circuit and thereby divert current from said field winding to reduce the output of said generator.

13. In an automatic electric regulator, a variable resistance, means for controlling the same, and a relay independent of said controlling means for modifying the effect of said resistance, said relay having a main electro-magnetic winding and an auxiliary winding for rendering said main winding ineffective under certain conditions.

14. In an automatic electric regulator, a variable resistance, means for controlling the same, and a relay for modifying the effect of said resistance, said relay having a coil which is effective only upon a predetermined voltage increase, and having also a normally deënergized differential coil which is energized after said first coil becomes effective.

15. A regulating system for a car lighting generator including a generator regulator, operating means therefor, auxiliary controlling means therefor operable upon the attainment of predetermined electrical conditions in the system, and means whereby said last means is rendered inoperative when the generator voltage reduces below a predetermined minimum.

16. In combination, a variable speed generator, current operated regulating means therefor, voltage operated controlling means for said regulator, and means whereby the voltage operated controlling means is rendered inoperative when the generator voltage reduces below a predetermined minimum.

17. In combination, a variable speed generator, current operated regulating means therefor, voltage operated controlling means for said regulator, and a single means whereby both regulating and controlling means are rendered inoperative whenever the generator voltage reduces below a predetermined minimum.

18. A car lighting system including a variable speed generator, a storage battery charged thereby, a current operated regulator for the generator, a voltage operated device for modifying the effect of said current operated regulator upon the attainment of a predetermined battery voltage, and means whereby the voltage operated device is rendered inoperative upon the generator voltage reducing below the voltage of the battery.

19. A car lighting system including a generator, a storage battery, a generator regulator, an auxiliary device for varying the standard of operation of the regulator upon the attainment of a predetermined voltage of the battery, and means whereby the auxiliary device is rendered inoperative whenever the generator voltage reduces below the battery voltage.

20. A car lighting system including a generator, a storage battery, a generator regulator, a modifying device coöperating with said regulator to reduce the generator output upon the attainment of a predetermined battery voltage, an automatic switch to connect the generator to the system, and means whereby closure of the automatic switch places the modifying device in condition for operation and opening of the automatic switch renders the modifying device inoperative to affect the generator output.

21. In a car lighting system, a generator provided with a shunt field, a storage battery to be charged by the generator, a generator regulator, a modifying device for varying the operation of the generator regulator upon predetermined conditions, means for rendering the modifying device inoperative when the generator voltage is reduced below the battery voltage, and means under control of the modifying device for causing excitation of the generator field from the battery whenever the modifying device is rendered inoperative.

22. In combination, a generator having a field winding, a storage battery to be charged thereby, and means responsive to predetermined electrical conditions of the battery to complete a relatively low resistance shunt about said generator field winding.

23. In combination, a variable speed generator having a field winding, a storage battery to be charged thereby, means responsive to predetermined electrical conditions of the battery to complete a relatively low resistance shunt about said generator field winding, and means whereby said shunt circuit is opened when the generator voltage falls below the battery voltage.

24. In combination, a variable speed generator having a field winding, a storage battery to be charged thereby, and means responsive to a predetermined voltage of the system to complete a relatively low resistance shunt about said field winding.

25. In combination, a variable speed, shunt wound generator, regulating means for said generator, a storage battery to be charged by said generator, and means responsive to predetermined battery conditions to complete a relatively low resistance shunt about said shunt field winding to reduce the generator voltage to thereby reduce the battery charging current.

26. In combination, a variable speed shunt wound generator, regulating means therefor, a storage battery to be charged by said generator, a voltage responsive relay adapted to respond to a predetermined voltage on the system, and a shunt circuit about the shunt field winding of said generator adapted to be closed by said relay to limit the charging current to said battery.

In witness whereof I have hereunto subscribed my name in the presence of two witnesses.

WILLIAM A. TURBAYNE.

Witnesses:
E. R. KING,
GEO. B. JONES.